United States Patent

[11] 3,631,857

[72] Inventor Horace P. Maddison
 3500 S.E. Concord #41, Milwaukie, Oreg. 97222
[21] Appl. No. 837,604
[22] Filed June 30, 1969
[45] Patented Jan. 4, 1972

[54] FLEXIBLE MALE URINAL RECEPTORS
 1 Claim, 3 Drawing Figs.
[52] U.S. Cl. ................................................ 128/295
[51] Int. Cl. ................................................ A61f 5/44
[50] Field of Search ........................................ 128/294–295

[56] References Cited
UNITED STATES PATENTS

| | | | |
|---|---|---|---|
| 3,364,932 | 1/1968 | Beach............................ | 128/295 |
| 3,405,714 | 10/1968 | Moss............................. | 128/295 |

FOREIGN PATENTS

| | | | |
|---|---|---|---|
| 922,089 | 3/1963 | Great Britain................ | 128/295 |
| 1,508,356 | 11/1967 | France.......................... | 128/295 |

Primary Examiner—Charles F. Rosenbaum
Attorneys—Daniel P. Chernoff and Jacob E. Vilhover, Jr.

ABSTRACT: The device is a flexible male external urinal adapted to the secured to a patient's body by a leakproof seal of closed bubble elastic foam plastic of annular configuration.

PATENTED JAN 4 1972 3,631,857

Horace P. Maddison
INVENTOR
BY
Atty.

FLEXIBLE MALE URINAL RECEPTORS

This invention involves an improvement in flexible male urinal receptors adapted to be secured to a patient's body having an open upper end and a lower discharge end, provided with a flexible conduit leading to a reservoir.

The weight of the receptor, its connections and the reservoir associated therewith, are usually supported by body attachments and thus the upper end of the receptor must be sealed around the penis to prevent urinary leakage. This presents a difficult problem because effective sealing must be maintained without producing undue constriction or abrasion. This two-fold necessity is difficult to attain when such a receptor is provided for an ambulatory user.

The principal deficiencies in prior devices are that the receptors must be more or less custom made or must be adjustable over a fairly wide range. To secure this accommodation, said devices frequently produced undue constrictive pressure on the organ to assure a complete and effective sealing.

I have discovered that a leak-proof seal may be formed by providing a thick-walled annular seal that has a high factor of resilience and accommodation to change in position of the patient's body. The seal preferably is made of a spongy flexible and elastic foam plastic that is nonabsorptive and is of the closed bubble or discontinuous air chamber form.

To produce maintenance of general configuration to the annular seal element, it preferably is firmly lodged within the bore of a rigid ringlike holder, also lodged within the sheathing of the receptor and encircled by the beaded upper edge formed upon the extreme upper margin of the sheathing. It is sufficiently constrictive to maintain the holder and the sheathing firmly in contact to prevent inadvertent separation. Due to the rigidity of the holder, the constrictive effect of the sheathing produces no increased constriction of the foam plastic seal element. The bore of said annular seal element is chosen to conform in diameter to the organ which it is designed to engage, to exert firm engagement therewith but being sufficiently yielding and resilient to produce no injurious constriction thereof.

The rigid holder also provides means for aiding the insertion of the organ into the receptor and the withdrawal therefrom. It also is preferably provided with a lateral peripheral flange to support the receptor in a web or other body support that is usually provided.

Thus, to fit a specific patient, the only variable that must be considered is to select a seal element that has a hole therein conforming to the organ to produce a leak-proof joinder therewith. This is wholly independent as to whether the patient is ambulatory or is bedfast. That is to say, the seal has sufficient flexibility and elasticity and other accommodation due to its thick wall to serve the needs of a walking or bedfast patient. The thickness of the wall of the annular seal permits change of angular position without producing chafing or without breaking the watertight seal when the user changes body position.

The details of my invention are hereinafter described in connection with the accompanying drawings in which.

Figure 1:
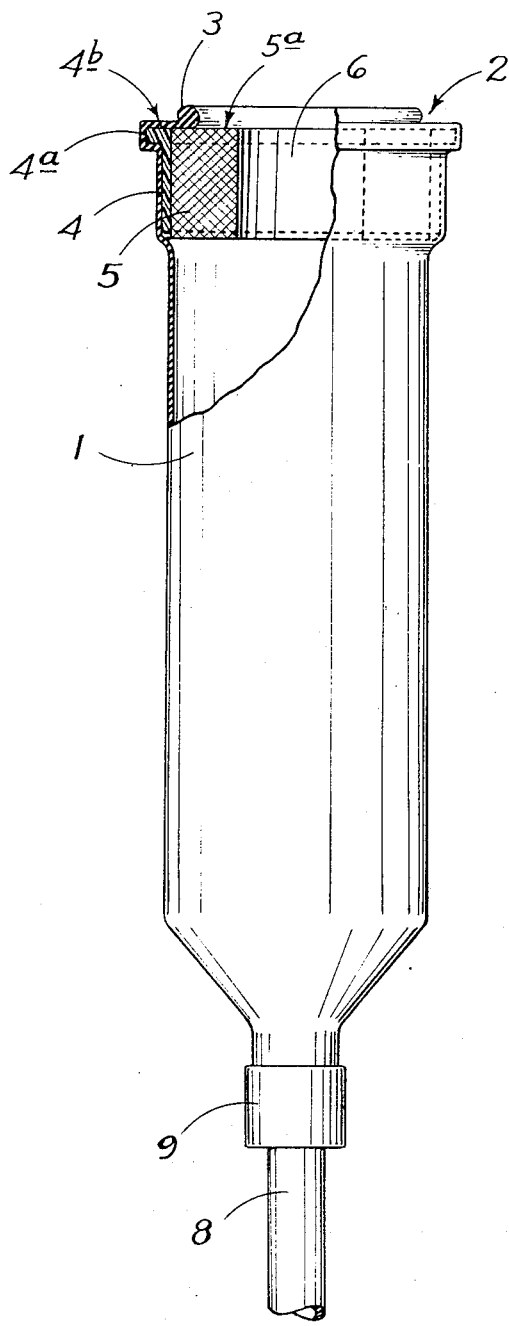
FIG. 1 is an elevation of a receptor embodying my invention with portions of the sheathing shown broken away to disclose details of construction thereof, and of the parts constrictively mounted and held in the upper end thereof.
Figure 2:
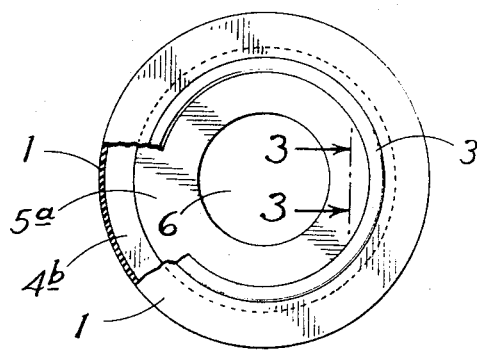
FIG. 2 is a plan view of said receptor with a portion of the upper margin of the sheathing shown broken away to disclose the relationship of the sealing element and holder therefor.

A male urinal receptor embodying my invention comprises a flexible cylindrical sheathing 1, which is thin-walled and preferably made of a flexible rubberlike material. Its open upper end 2 terminates in beading 3, which preferably is of circular section, as is shown in FIG. 1.

Constrictively held within the sheathing constituting the body of said receptor is holder 4. This preferably is made of a rigid plastic ring terminating in an upper peripheral flange 4a. This is constrictively held within the sheathing with the peripheral flange arranged inwardly of the beading 3, as is illustrated in FIG. 1, so that the latter overlies the upper face 4b of the peripheral flange. Arranged within the bore of said holder is sealing element 5. The beading is proportioned and arranged so that when the parts are assembled within the sheathing, the beading will overlie the upper face 5a of the sealing element as well as the upper face 4b of the peripheral flange which lie in the same horizontal plane.

Figure 3:
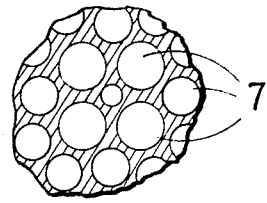
FIG. 3 is a schematic sketch shown on a larger scale but being taken generally on the line 3—3 in FIG. 2, to disclose the structure of a plastic foam suitable for the construction of said sealing element.

The sealing element is thick-walled. That is, the bore 6 of the sealing element is approximately twice the thickness of the walls. That is the walls are about one-quarter the diameter of the sealing element, and the bore is about one-half thereof. I say this is approximately true, as is shown in the drawing. To produce a custom fit of the sealing element to the organ to which it is applied, it is essential that the said bore be only slightly smaller than the diameter of the organ so as to produce a clinging moistureproof fit and without undue constriction. The plastic foam has bubblelike apertures formed therein when viewed on an enlarged scale, as shown in FIG. 3, and thus the yieldability is promoted by flexure of the portions of the foam surrounding the closed cavities 7 formed in this sealing element. That is to say, the cavities in the plastic foam are not continuous, but each is separated by a septum of plastic that envelopes each one, and separates it from an adjacent cavity.

The seal is nonabsorptive of moisture. The plastic foam also should be one that does not react to urine. This is true of most of the plastic foams that are presently on the market. The sealing element is not adhesively bonded to the holder, nor is the holder bonded to the sheathing and thus the parts may easily be separated and cleaned. The thickness of the sealing element is slightly greater than the width of the holder so that a portion protrudes below the lower edge of the holder. This is not critical, but it does tend to prevent a sharp edge being formed over said lower edge of the holder which might sever the sheathing. The step joint shown in FIG. 1 permits the sheathing to contract beneath the holder on a smooth curve.

My experience has caused me to conclude that it is well to have a number of different sealing elements for each patient, and the sealing elements should have bores that differ slightly in size. If it for this reason that the parts should easily be removable and interchangeable to promote comfort and accommodation to the patient without disturbing the moisturetight seal.

In the drawings, I have shown no harness for supporting the weight of the receptor, nor have I shown a reservoir usually provided. Suffice to say that these parts are used with a receptor embodying my invention and a reservoir (not shown) is joined to the receptor by a tubular conduit 8 shown foreshortened in FIG. 1. This sheathing and the conduit are usually flexible and are provided with a nut or other securing device 9 to permit their separation for cleaning, and for replacement, if necessary.

Many receptors are provided with sheathings and mounts therefor with loops and other means of attachments. Said harness may be made of belts, webbing, elastic and nonelastic supportors and the particular type of mount is of no concern to my invention and thus none is disclosed in connection therewith. The lateral peripheral flange on the holder, as shown in FIG. 1, permits the receptor to be extended through an aperture or well in webbing or other harness to support the receptor, because the flange is substantially larger than the remainder of the holder and the sheathing has sufficient elasticity that it conforms to the outline of the holder when the sheathing is at rest. By arranging said parts to lie wholly within the sheathing, a receptor is formed that presents no sharp corners that might produce cutting or abrasion. This is particularly of concern in bedfast patients.

I claim:

1. A male urinal receptor constituting an organ holding device, comprising a. a flexible sheathing adapted to be maintained pendant, and having an open upper end and a closed lower end provided with a communicating discharge conduit, b. a thick-walled annular sealing element held securely, but removably mounted, within the upper end of said receptor sheathing, said sealing element being integrally and homogeneously constructed of a flexible, closed-bubble, moisture-impervious plastic foam material so as to produce leakproof engagement with the organ to be accommodated therein, and c. a rigid annular holder having a central bore conforming to the peripheral outline of said sealing element and being constrictively held within said sheathing inwardly of the upper end thereof, with said annular sealing element being coaxially lodged within the bore of said holder.

* * * * *